United States Patent [19]

Bienek et al.

[11] Patent Number: 4,738,388

[45] Date of Patent: Apr. 19, 1988

[54] PROCESS FOR SEALING A CONTAINER FOR STORING RADIOACTIVE MATERIAL AND CONTAINER FOR IMPLEMENTING THE PROCESS

[75] Inventors: Heinz Bienek, Oberhausen; Wilhelm Wick, Essen, both of Fed. Rep. of Germany

[73] Assignee: Steag Kernenergie GmbH, Essen, Fed. Rep. of Germany

[21] Appl. No.: 756,095

[22] Filed: Jul. 17, 1985

[30] Foreign Application Priority Data

Jul. 24, 1984 [DE] Fed. Rep. of Germany ....... 3427179
Feb. 4, 1985 [DE] Fed. Rep. of Germany ....... 3503641

[51] Int. Cl.[4] ........................ B23K 31/00; G21C 19/00

[52] U.S. Cl. .................................... 228/135; 228/140; 228/175; 228/184; 228/193; 228/212; 29/404; 29/446; 252/633; 220/15; 376/272

[58] Field of Search ........................ 220/289, 298, 1 S; 252/633; 228/135, 140, 184, 186, 175, 212, 193; 29/446, 404; 376/272

[56] References Cited

U.S. PATENT DOCUMENTS

| | | | |
|---|---|---|---|
| 1,902,862 | 3/1933 | Kerr et al. | 220/298 |
| 3,136,447 | 6/1964 | Lawrence | 220/298 |
| 3,210,837 | 10/1965 | Hassellof | 29/446 |
| 3,300,839 | 1/1967 | Lichti | 29/446 |
| 3,555,664 | 1/1971 | Bingham et al. | 228/115 |
| 3,932,922 | 1/1976 | Thastrup | 29/446 |
| 4,437,578 | 3/1984 | Bienek et al. | 29/400 N |
| 4,491,540 | 1/1985 | Larker et al. | 252/633 |
| 4,501,058 | 2/1985 | Schutzler | 29/446 |
| 4,579,274 | 4/1986 | Anspach et al. | 29/446 |

FOREIGN PATENT DOCUMENTS

| | | | |
|---|---|---|---|
| 507386 | 12/1951 | Belgium | 228/140 |
| 2472819 | 7/1981 | France | 252/633 |
| 750073 | 6/1956 | United Kingdom | 228/140 |

*Primary Examiner*—M. Jordan
*Assistant Examiner*—Samuel M. Heinrich
*Attorney, Agent, or Firm*—Young & Thompson

[57] ABSTRACT

A lid (9;21;22;25) is welded to the front storage opening of a container base (1). To improve the stress corrosion cracking characteristics in the area of the welding seam it is proposed that during welding the lid (9;21;22;25) be kept in contact with a contact surface (5) of the container base (1) under a preset pressing force which considerably exceeds the weight of the lid. The invention is also directed to a correspondingly shaped container. The preset pressing force is preferably maintained by a threaded engagement or a shrink engagement between lid and base.

2 Claims, 3 Drawing Sheets

PROCESS FOR SEALING A CONTAINER FOR STORING RADIOACTIVE MATERIAL AND CONTAINER FOR IMPLEMENTING THE PROCESS

The invention relates to a process for sealing a container made of metal material for storing radioactive material, especially radioactive material placed in an inner container, wherein a lid is welded to the front storage opening of a container base.

A process of the above mentioned type is known from EP-A2 77 955, wherein, on the one hand, a flat lid with a rim flange extending outwardly is placed in the front storage opening and the front of the container base is welded to the front of the flange of the lid and, on the other hand, a flat lid rests on an annular flange extending along the front end of the container and is welded to the container base along a annular welding seam.

In the case of the known container with cylinderlike lid FIG. 1 of EP-A2 77 955) no pressing force is applied in the joint area, while in the case of platelike FIG. 2 of EP-A2 77 955) the pressing force is determined only by the weight of the lid.

As a result of absent or insufficient pressing force, both lid configurations because of the thermal stress during welding can undergo arching or splitting, which corresponds to a stress load on the welding seam.

When such a container is put in an ultimate storage location and the lid is put under load by a geological formation, e.g. salt or granite, the welding seam thereby is put under load with shearing and tensile stresses that are critical for the corrosion of the material, which are caused by deformation of the flat lid plate. Such a stress load on the welding seam deteriorates its corrosion properties quite substantially.

The object of this invention is to provide a process for sealing a container of the above mentioned type, wherein such loads on the welding seam are essentially impossible when the container is placed in the ultimate storage facility.

This object is attained according to the invention by the fact that the lid, arched like a dome at least on its inner surface, is kept in contact with a contact surface of the container base formed in the area of the front storage opening, during welding to the container base, under a preset pressing force which considerably exceeds the weight of the lid.

By contact of the lid under a preset pressing force on the contact surface of the container base, a surface contact is maintained during welding, which avoids arching or splitting. As a result of the lid inner surface that is arched like a dome, when the lid is put under load essentially no corrosion critical shearing or tensile stresses are introduced in the welding seam, since, in contrast with a flat lid, no inward buckling is possible in the case of a lid that is at least arched inward of its periphery. In other words, to avoid relative movement of the lid under the load at the ultimate storage facility and corrosion critical additional stresses (tensile and/or shearing stresses) in the welded joint between lid and container base at the ultimate storage facility, it is important to press the lid against the contact surface of the container base during making of the welding joint. In this connection, the pressing force is chosen on a level with the outside load prevailing at the ultimate storage facility.

A particularly simple carrying out of the process in handling the container in the hot cell is attained, if the pressing force is applied by a pressing device on the lid from the outside and the pressing device is removed after welding. After removal of the pressing device, the weld itself bears the pressing or pre-stress force until creation of an outside pressure at the ultimate storage facility. However, at the ultimate storage facility the welded joint again becomes free of stress, so that stress corrosion cracking is avoided.

Preferably, however, this pre-stress essentially is to be removed not in the welded joint but in a positive or nonpositive engagement between lid and container base.

Preferably, the pressing force is created by a positive engagement between lid and base, preferably by a threaded engagement between an outside thread of the lid and an inside thread of the container base. With this embodiment, the flanking load of the positive locking is relieved with the outside pressure load of the lid. Instead of a threaded engagement as positive locking, a bayonet lock or the like can be used.

Moreover, it is advantageous, for cutting production costs and improving corrosion resistance, to apply the pressing force by a pressing device acting on the lid from the outside and by the action of the pressing device to shrink the lid into the front storage opening and to remove the pressing device after creating a shrink engagement.

The shrink engagement sees to it that even without applying the pressing device the lid is held with the necessary pressing force in contact with the contact surface of the container base.

The invention is also directed to a container for embodiment of the process.

The container according to the invention is characterized in that the lid is arched like a dome at least on its inner surface and is held in contact on a contact surface of the container base formed in the area of the front storage opening.

Preferably the lid is provided with an outside thread, which engages with an inside thread formed in the area of the front storage opening. As a result, an especially simple application of the pressing force is attained and when shipping devices are applied to the lid no load occurs on the welding seam.

But it is also possible for the lid to be provided with an outside shrink engagement surface, which is in shrink engagement with an inside shrink engagement surface provided in the area of the front storage opening. With this embodiment of the container, the production of outside and inside threads or other positive engagement means is not necessary.

The outside surface of the lid can, e.g., be a plane surface extending radially. However, it is preferable for the lid to be arched like a dome on its outside surface as well. There is a series of possibilities for the position of the welding seam. However, it is preferred that the lid be provided on its outer surface, which is arched like a dome, with an axially extending annular projection, whose outside diameter matches the inside diameter of the front storage opening on its free end. Such a design is known from EP-A2 77 955 (FIG. 2) and from the older publication KfK 3000, September 1980—"Comparison of the various waste disposal alternatives and assessment of their feasibility,"—study—"Waste disposal alternatives," Nuclear Research Center, ISSN 0303-4003, pages 4–69, illustration 4.9—"Double-shell fuel element container." The last named citation relates to a double-shell fuel element container in which the outer container shell is welded to an outer lid formed in accordance with FIG. 2 of EP-A2 77 955.

But it is also possible to provide the lid with a peripheral flange that rests on and/or is in contact with the corresponding annular surface of the container base.

With the use of an annular projection, a shipping mushroom can advantageously be screwed into it.

In the case of a container with a shrink lid, a diffusion welding can be made between the shrink engagement surfaces, as, e.g., is described in patent application No. P 33 34 660.7-33 of 9/24/1983.

The invention will now be explained in more detail with reference to the accompanying drawings, in which.

Figure 1:
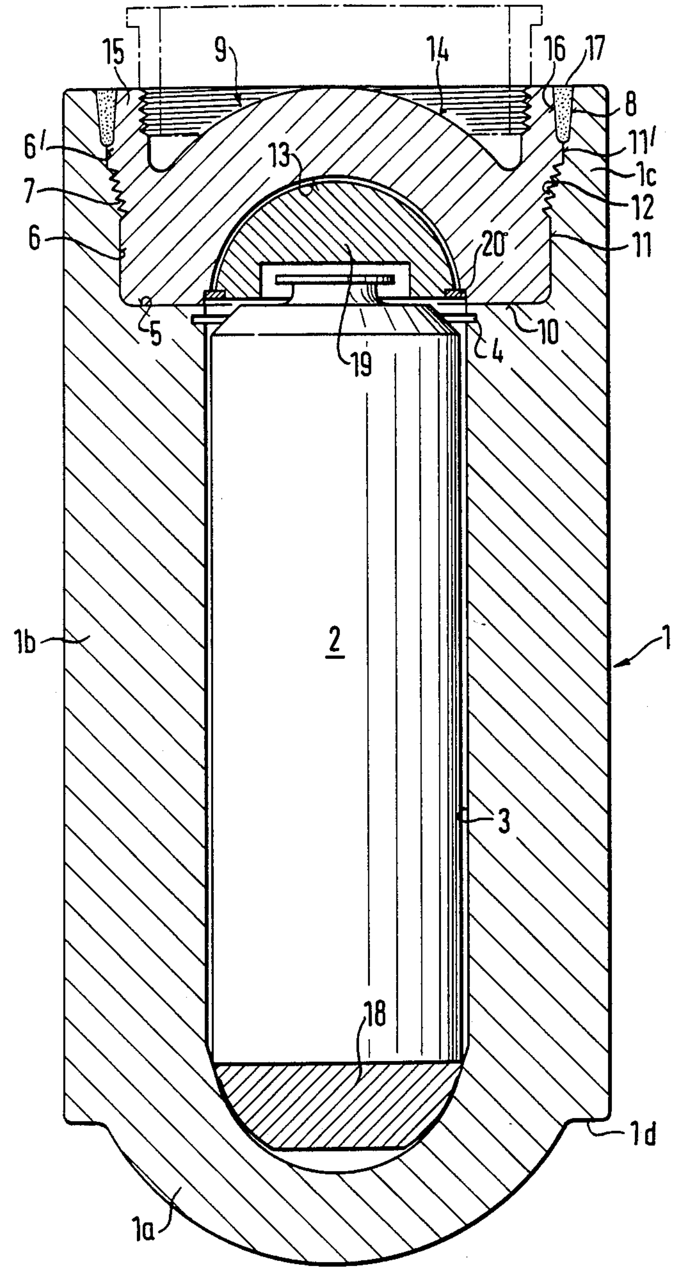
FIG. 1 is a sectional view of a first embodiment.

A mold 2 with highly radioactive waste is placed in a container base 1 which consists of a bottom 1*a* arched like a double dome, a straight cylindrical jacket 1*b* and a storage opening area 1*c*, wherein a gap remains at the inner surface 3 of jacket 1*b*. A relief groove 4 and an annular contact surface 5, extending radially, are provided in the transition area of jacket 1*b* and storage opening area 1*c* (see FIG. 1). An axially extending guide surface 6, an inside thread 7, shorter guide surface 6' and a jointing surface 8 adjoin contact surface 5. Inside thread 7 is preferably designed as a taper thread. A lid 9 is screwed into storage opening area 1*c* and, with an annular support surface 10 rests on contact surface 5. Moveover, it is guided at guide section 11 and 11' on guide surface 6 or 6' and with an outside thread 12 is in a threaded engagement with inside thread 7.

Inner surface 13 and outer surface 14 of lid 9, surrounded by support surface 10 are arched like a dome. Lid 9 is provided on the outside surface with a annular projection 15, which has a jointing surface 16 corresponding to jointing surface 8.

To seal the container, lid 9 is screwed between surfaces 5 and 10 until a preset pressure force is reached. Then a tight welding seam 17 is made between the two jointing surfaces 8 and 16.

The welding seam can be made with welding auxiliary material or by welding without welding rod.

When lid 9 is loaded at the ultimate storage facility no stress is transferred to welding seam 17 as a result of deformation of the lid, so that essentially stress corrosion cracking cannot occur in it.

The domelike design of bottom 1*a* and of lid 9 allow the introduction of additional shields 18 and 19 respectively, whereby additional lid shield 19 is secured in the lid by a ring 20.

With the formation of an inside thread on its inner surface engaging outer dome 14, annular projection 15 allows the screwing in of a shipping mushroom, shown in a dot-dash line in FIG. 1, which can be unscrewed at the ultimate storage facility.

The depth of the corrosion path is determined by the depth of welding seam 17 and can be extended by a corresponding extension of annular projection 15 and of the container base.

As can be seen from the above description and especially from FIG. 1, to which reference is expressly made here, the wall thicknesses of container bottom 1*a* and lid 9 are made thinner than the wall thickness of jacket 1*b*. By this means, the different radial deformation of the lid shaped like a dome or of the bottom arched like a dome is offset within certain limits.

As can be seen in FIG. 1, the domelike outside surface of additional lid shield 19 is placed a certain distance from inner surface 13 of the lid, so that internal additional shield 19 can be radially shifted to a certain extent, so that the container jacket in the lid area can be freely deformed under outside pressing load without shield 19 and thus holding ring 20 being loaded. Also additional shield 18 is so shaped relative to bottom 1*a* that there is a radial movability.

Figure 2:
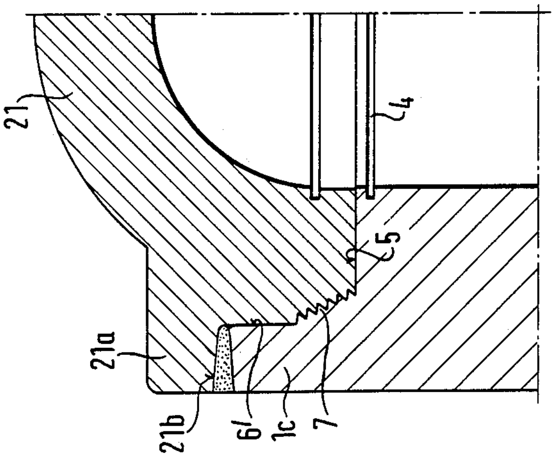

With the embodiment according to FIG. 2, a peripheral flange 21*a* is provided on a lid 21, the underside 21*b* of which flange is welded to the free front surface of the storage opening area 1*c*. In this embodiment, guide surface 6' between thread 7 and free front surface, is made in a narrow fit to avoid a radial shifting of lid 21.

Figure 3:
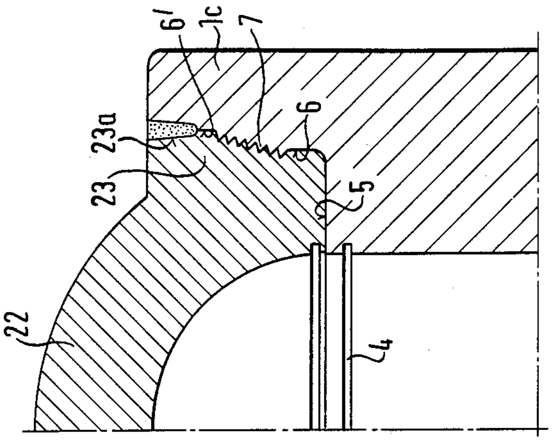
FIGS. 2 and 3 are partial sectional views of further embodiments with threaded engagement between lid and container base.

In the embodiment according to FIG. 3, on lid 22 is provided a peripheral flange 23 whose outside surface 23*a*, extending essentially axially, is welded to a peripherally extending partial surface of storage opening area 1*c*.

Figure 4:
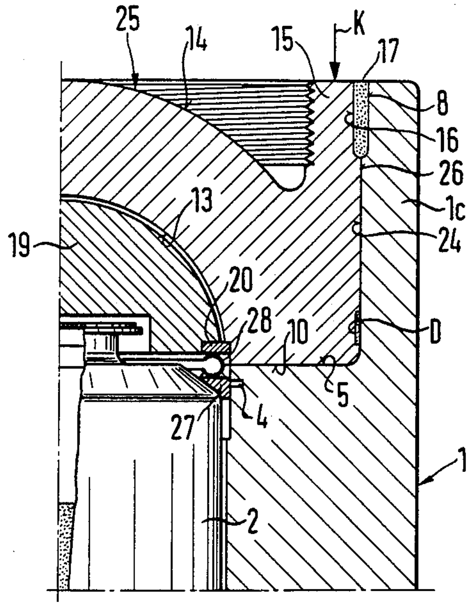
FIG. 4 is a detail showing an embodiment with shrink engagement between lid and container base.

In the embodiment according to FIG. 4, to contact surface 5 of container base 1 is joined a smooth-surfaced, straight cylindrical engagement surface 24 that extends axially, which is followed by jointing surface 8; these surfaces together determine the storage opening area 1*c*.

In the latter a lid 25 is shrunk, which with its annular support surface 10 is in contact with contact surface 5 under a preset pressing force which exceeds the weight of the lid. Like lid 9, lid 25 exhibits surfaces 13 and 14 arched like a dome and an annular projection 15 with a jointing surface 16 corresponding to jointing surface 8. Further, the lid is provided with a shrink engagement surface 26 which is in shrink engagement with surface 24.

In the container, mold 2 is centered on its upper end in relation to the container and secured against axial movement in the ultimate storage container by means of a fastening ring 27 with a weld slotted spring element 28, which is in contact with retaining ring 20. This measure can also advantageously be used in the embodiments according to FIGS. 1–3. Conically shaped retaining ring 27 corresponding to the shape of the mold contributes to shielding from scattered radiation in the axial direction.

For sealing the container base with lid 25 after insertion and centering of the mold storage opening area 1*c* is heated, preferably externally by induction. Then, the lid, previously undercooled in comparison with the ambient temperature, is inserted into the storage opening and, with a force being applied externally to lid 25 by a pressing device, is kept in contact with contact surface 5 until a temperature balance occurs between the lid and container base. The geometry and fit of lid and storage area are selected so that, after the temperature balance, the lid, because of the adhesions caused by the pressing stress, is held immovably in the container base to such an extent that even after removal of the externally acting forces (symbolically represented in FIG. 4 by arrow K attacking projection 15), the preset pressing force between surfaces 5 and 10 continues to be maintained. To create the shrink engagement, it can possibly only be necessary to heat or cool one of the components.

After shrinking of the lid, with a subsequent preheating of lid and container base in the area of jointing surfaces 8 and 16 and making of welding seam 17, both components are uniformly heated and thus deformed in such a way that the radially directed pressing stress and the axially directed preset pressing force continue to be maintained. It is also possible, instead of a continuous smooth fit in the area of surfaces 24 and 26, to use a stepped fit, e.g., a fit, stepped once, with approximately equally long seats as well as different tolerance zones. For example, the fit adjacent to welding seam 17 can be made with a larger diameter as a pressing fit and the fit underneath it and closest to contact surface 5 with a smaller diameter as a transition fit. The result is that even with most unfavorable actual measurements of the two fits, the smallest excess measurement of the upper fit is approximately equally large as the largest excess measurement of the lower fit. Thus, in the upper fit adjacent to welding seam 17 there is always present an adequate shrink pressing between the jointing surfaces of the lid and the container base.

Also in the lid configuration according to FIGS. 2 and 3, a shrink engagement can be provided for holding of the pressing force instead of a threaded engagement.

Finally, in the case of the smooth-walled shrink engagement it is also possible to make a diffusion welding between the shrink engagement surfaces, as is described in pending patent application No. P 33 34 660 of the applicant of 9/24/1983. In this connection, the diffusion welding can cover the entire engagement surface or a part of it, e.g., like a ring, as is indicated by reference D in FIG. 4. The diffusion welding can relieve outside welding 17 at least in part or perhaps replace it entirely. However, for reasons of safety, making of an outside checkable welding seam is always preferred.

Unalloyed or low-alloyed steels or castings are preferred as the metal material for container base 1 and lid 9, 21, 22 and 26. A seal can additionally be made between contact surfaces 5 and 10, e.g., by insertion of a silver ring or foil or by a diffusion welding according to P No. 33 34 660.

The welding seam can be made by known processes, e.g., electron beam or by induction. The embodiment according to FIG. 1 is preferred from the technical welding viewpoint, since in this embodiment relatively small material masses must be heated to make welding seam 17.

It is important that the welding seam not be acted on by tensile or shearing stresses as a result of the pressing force on the contact surfaces of the container base and lid, and that in the application of a high operating pressure on the container base and lid, as a result of the contact and domelike shape at least of the inner surface of the lid a stress-induced corrosion in the welding seam be avoided. In the use of a lid with a threaded engagement or a comparable positive engagement or with a shrink engagement, the welding seam must essentially act only as a sealing seam, since the shipping forces acting on the lid are taken up by the positive engagement or the shrink engagement. It should be pointed out that the welding joint, whether as an outside welding seam or inside diffusion welding joint, deliberately contributes to corrosion protection and/or to fastening of the lid. In the case of the embodiment with shrunk lid the shrink engagement enhances the corrosion resistance, so that the axial length of welding seam 17 can perhaps be correspondingly reduced.

The expression "welding" used in the claims and description also includes soldering, provided reference is not made explicity to "diffusion welding."

Between bottom 1*a* and jacket 1*b* an annular surface 1*d* is provided (see FIG. 1) which corresponds to the annular endface of the storage opening area 1*c* and therewith allows a stacking of the containers.

What we claim is:

1. Method for sealing a metal container for storing radioactive material, comprising the steps of: placing a lid having a substantially semispherical inner cavity and a first radial bearing surface extending outwardly from said cavity, into an open end of a container comprising a storage cavity and a second radial bearing surface extending outwardly of said storage cavity, said lid and said container being so dimensioned that said first and second bearing surfaces will bear directly against each other following said placing step, and relative bodily displacement of said lid and said container in a direction transverse to the direction of said placing step is precluded; applying said first and second bearing surfaces against one another at a predetermined pressure substantially equal to an external pressure to which said container will be subjected during storage; welding said lid to said container along a seam formed between said lid and said container, said seam being offset from said first and second bearing surface in said direction of placement, said welding step being performed while maintaining said first and second bearing surfaces applied together at said predetermined pressure, and relieving said predetermined pressure subsequent to said welding.

2. Process according to claim 1, wherein said predetermined pressure is attained by applying said lid against said container with a pressing device external to said container, and said pressing device is removed after welding.

* * * * *